June 1, 1948.  E. I. EIGENBERGER  2,442,346
VARIABLE VOLTAGE DRIVE
Filed Sept. 7, 1945
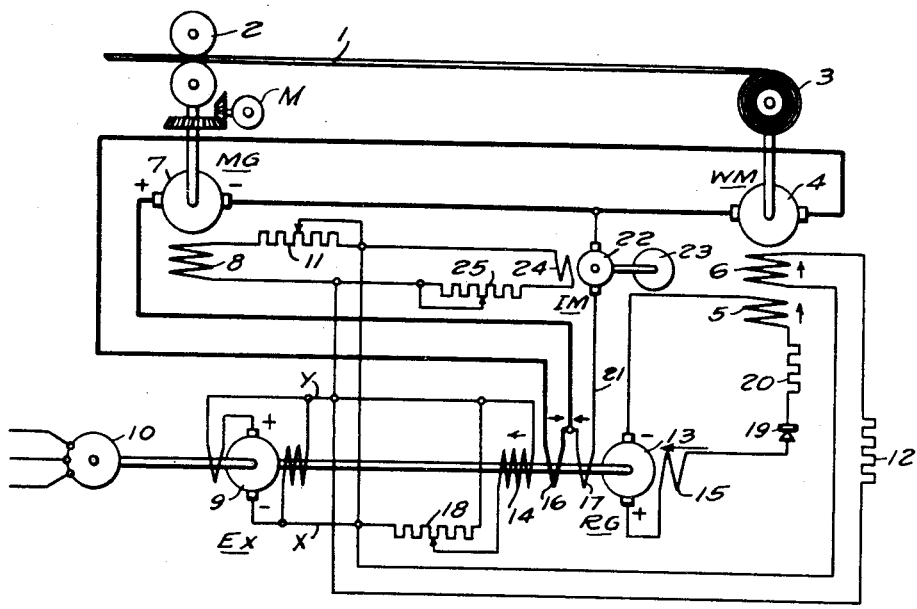
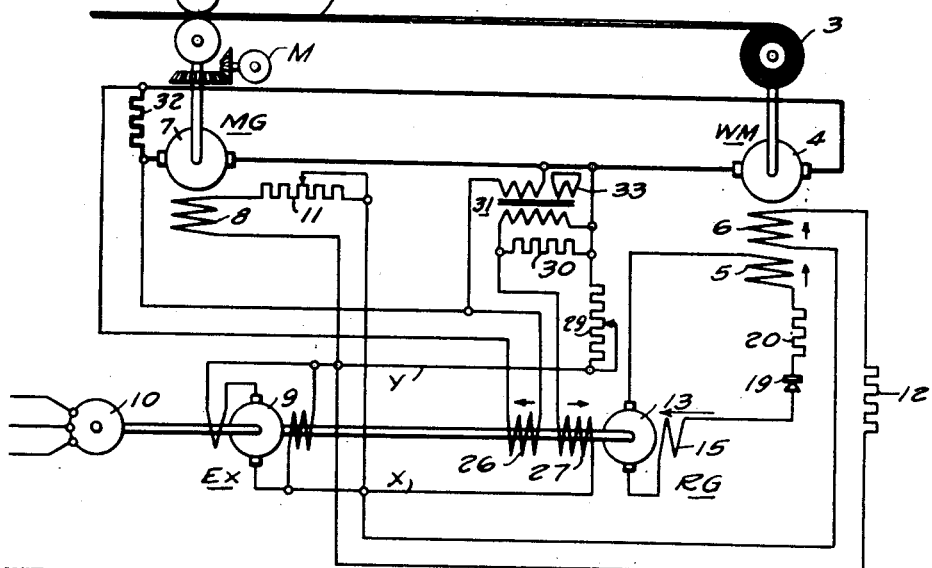
WITNESSES:
INVENTOR
Elroy I. Eigenberger.
BY
Paul E. Friedemann
ATTORNEY Patented June 1, 1948

2,442,346

UNITED STATES PATENT OFFICE 2,442,346

VARIABLE VOLTAGE DRIVE

Elroy I. Eigenberger, Pittsburgh, Pa., assignor to Westinghouse Electric Corporation, East Pittsburgh, Pa., a corporation of Pennsylvania Application September 7, 1945, Serial No. 614,941

11 Claims. (Cl. 318—6)

My invention relates to electric drives of the variable voltage type and especially to systems whose drive motor is controlled to maintain a substantially constant driving effort at different speeds within an available speed range.

Such systems are employed, for instance, in winder drives serving to wind or unwind a reel of material, such as sheets, threads, strands, or strips, while securing a substantially constant winding tension in the material regardless of the winding speed. Known drives of this kind are provided with a regulating generator which operates to maintain the armature or load current of the drive motor at a substantially constant value. Under steady state conditions, the winding tension or the driving effort of the motor is substantially proportional to the motor load current so that these drives are in fact capable of maintaining a given winding tension regardless of the selected motor speed. However, these known systems operate with satisfactory perfection only during steady state speed conditions, but fail to secure a constant winding tension or driving effort during periods of acceleration or deceleration. This deficiency is due to the fact that an increase in winding speed requires an increased current consumption in the driving motor in order to accelerate the reel, while the regulating generator is unable to sense such an increased current demand and continues to act as a constant current regulator. For instance, if a reel drive requires a motor current of 10 amperes under steady states conditions, more than 10 amperes is required for causing the motor to accelerate the reel and still maintain the same tension; and since the above-mentioned systems cannot operate to furnish the increased current, the winding tension is not constant during such periods of changing speed.

It is among the objects of my invention to provide a variable voltage motor control system capable of securing a desired constant driving effort at different speeds not only during steady state conditions but also during periods of acceleration and deceleration of the drive; and it is one of the more specific objects to devise a winder drive which maintains a constant winding tension during transient speed conditions with the aid of control means of simple design that are applicable in variable voltage drives of the abovementioned type without interfering with the performance of these drives during steady state operating conditions.

Another limitation of the known variable speed drives lies in the fact, that a regulation for constant motor current does not always secure the same driving effort or winding tension if the drive is designed for wider ranges of speed. For instance, in reel drives having high top speeds or a wide speed range, the power required to overcome friction and windage increases considerably at the higher speeds. Hence, if in the abovementioned example the same current of 10 amperes is maintained at low and high speeds, some of this current will be required at high speeds to overcome the increased friction and windage, which leaves less current to take care of the required tension. That is, the winding tension at high speed will be lower than at low speed unless some readjustment is made by the operator.

It is another object of my invention to devise a variable voltage drive which eliminates also the last-mentioned shortcoming of the known systems and affords obtaining the same value of driving effort or, in the case of winder drives, the same value of winding tension regardless of the speed magnitude without requiring supervision and adjustment by an attendant.

According to my invention, I provide a variable voltage drive, normally regulated for maintaining a constant armature current in the drive motor armature, with control means which modify the regulatory effect in response to changes of the variable voltage so as to increase the speed of response of the motor to such changes; and I equip these control means with an inertia-delayed impedance device such as an inertia or flywheel motor or an electric reactive impedance, so that the modifying effect is substantially in accordance with the acceleration or deceleration characteristic of the drive motor and takes care of changing the regulated motor current in the direction required for maintaining a substantially constant driving effort or winding tension during the periods of motor acceleration or deceleration.

These and other objects and features of my invention will be apparent from the following description of the embodiments illustrated in the drawing, in which:

Figures 1 and 2 show the circuit diagrams of two different winder drives designed and operative in accordance with the invention.

In Figure 1, the material to be wound up by the drive is denoted by numeral 1. The material passes from a machine unit, for instance a press or calender which forms part of a paper machine, onto a take-up reel 3. The machine unit 2 is driven at adjustable speed from a suitable drive motor or line shaft (not illustrated), while the reel 3 is driven through a transmission from the armature 4 of a winder motor WM. This motor has cumulatively acting field windings 5 and 6. The machine unit 2 is connected by a transmission with the armature 7 of a main generator so that the armature rotates at a speed proportional to that of the unit 2, in order to generate a voltage which changes also in proportion to the driving speed. The generator armature 7 is electrically connected to the armature 4 of the drive motor WM.

An exciter generator EX serves as a source of constant direct-current voltage. Its armature 9 is driven by a constant speed motor 10 and energizes the exciter mains X and Y. The field winding 8 of the main generator is connected across mains X and Y in series with a rheostat 11 which permits adjusting the generator field excitation and hence the output voltage of the generator. The adjustment of rheostat 11 is normally fixed during the operation of the system so that the load voltage imposed on the motor depends only on the speed of generator MG and hence on the speed with which the sheet material 1 leaves the machine unit 2. The motor field winding 6 is also connected across mains X and Y in series with a calibrating rheostat 12 whose adjustment remains also constant during the operation of the system. The field winding 6 serves as a speed-limiting field. That is, when the excitation of field winding 5 is reduced, the maximum speed of the motor is limited by the constantly excited field winding 6 in order to prevent the drive from overspeeding.

The armature 13 of a regulating generator RG is mounted on the shaft of the constant speed motor 10. This generator has four field windings denoted by 14, 15, 16 and 17, respectively. The field winding 14 is provided with excitation from a potentiometric rheostat 18 which is connected across mains X and Y. The adjustment of potentiometer 18 determines the magnitude of the load current which the regulating generator RG tends to maintain constant in the armature circuit of the drive motor. The winding 15 serves to provide self-excitation for the regulating generator and is connected in the circuit of armature circuit in series with a rectifier 19, a resistor 20, and the field winding 5 of motor WM. The field winding 16 of generator RG is series-connected in the armature circuit of motor WM so that its energization is proportional to the load or armature current of the motor WM. The polarity of winding 16 is such that its field acts differentially with respect to the field of winding 14. The field winding 17 is connected for cumulative action relative to field winding 14. The resultant field of windings 14 and 17 (pattern field) is balanceable by the field of winding 16 (pilot field), and such balance obtains during the steady state condition of the drive system. The resistance of the circuit of the self-excited field winding 15 is so rated by means of the resistor 20 that the resistance characteristic of the self-excited field is approximately coincident with the no-load saturation characteristic of the regulating generator RG. As a result, the self-excited field winding 15 provides just enough excitation to sustain the output voltage of the regulating generator provided this generator operates within the unsaturated range of its characteristic. As a result, the value of this output voltage is determined by the separately excited field windings of the generator. When the system reaches its steady state operating condition, so that the pilot field and the pattern field are mutually balanced, the self-excited field winding 15 will continue to maintain the output voltage at the value previously adjusted by the separately excited fields.

The energization for field winding 17 is provided by a circuit 21 which is connected across the armature 7 of the main generator MG and hence changes in accordance with the load voltage produced by the generator MG. The circuit 21 includes an inertia-delayed impedance device which, in this embodiment, consists of an inertia motor IM. This motor is of standard design. It has its armature 22 series-connected in the control circuit 21, and its shaft carries a flywheel 23. The field winding 24 of motor IM is energized from mains X and Y through a calibrating rheostat 25. The motor IM runs idle during the operation of the system, and its inertia, determined by the flywheel, is so rated as to correspond approximately to the average inertia of the loaded reel 3.

When the drive system operates under steady state conditions so that the reel 3 is driven at a constant speed properly correlated to that of the unit 2, the resultant pattern field of windings 14 and 17 is balanced by the pilot field of winding 16. If, due to some irregularity, the load current of motor WM should increase or decrease, the pilot field will change accordingly, and hence disturb the balance in one or the other direction. The resultant differential field effect causes the output voltage in the armature circuit of the regulating generator RG to change accordingly. As a result, the excitation of the motor field winding 5 is varied in the direction necessary to change the motor speed toward reestablishment of the correct value of load current. In this manner, the system regulates the speed of motor WM for maintenance of a constant load current, and hence of constant winding tension in the material 1 passing onto the reel 3. As regards this regulating function under steady state conditions, the performance of the system is substantially similar to the above-mentioned known variable voltage drives. When the system operates under transient speed conditions, for instance, when the system is started initially or when the speed of the machine unit 2 is changed from one to another value, the following function is superimposed on the above-mentioned regulating performance. Considering first the case of an increase in the speed of the machinery 2, the generator voltage builds up substantially as fast as the change in speed, and the motor WM attempts to speed up. The inertia motor IM also accelerates while overcoming the retarding effect of its inertia. During this period of acceleration, the armature 22 of the inertia motor consumes an increased amount of current. This current flows through the pattern field winding 17, and thus recalibrates the resultant pattern field of the regulating generator RG in a direction and to a degree equivalent to a setting of the rheostat 18 for a higher reel motor current. This, in turn, causes the reel motor WM to accelerate as rapidly as the generator voltage changes and still maintain the desired constant tension in the reel material. The initially high current of the inertia motor IM gradually tapers off to practically a no-load value. Consequently, the automatic recalibration of the resultant pattern field in the regulating generator is gradually reduced to its original setting.

Referring now to a decrease in the voltage generated by the main generator MG, the conditions in the known control systems, that is in systems which are not provided with an inertia-delayed control circuit according to the invention, are as follows. A rapid decrease of the main generator voltage causes the reel motor to regenerate power and to impress this power on the main generator. The current responsive pilot field in the regulating generator reverses its polarity and the control voltage generated by the regulating generator is reduced to zero. The reel motor then attempts to run at a high speed. The result of these effects is a marked increase in the tension of the material wound onto the reel. Due to the presence of the inertia control according to the invention, however, the field winding 17 overcomes the tendency of the regulating generator RG to lose control upon occurrence of regeneration. This is due to the fact that the inertia motor IM also regenerates when the main generator speed is suddenly reduced so that the field winding 17 reverses its polarity and overbalances the differential effect of the regenerative current passing through the current responsive field 16. Consequently, a control system according to the invention produces its advantageous effect also during periods of deceleration.

The use of an inertia motor as described above achieves an additional corrective effect. As the speed of the take-up reel increases, the windage and friction losses increase and should be taken care of by a recalibration of the pattern field excitation in the regulating generator, in order to obtain the same tension during such high speed conditions. High reel speeds occur at high generator voltages. The inertia motor has a small steady state current at low voltages and its current value increases at higher voltages. This automatic increase in the steady state current of the inertia motor with the increase in reel speed has the effect of recalibrating the pattern field by increasing the energization of winding 17. In this manner, the regulating generator serves to compensate for increased friction and windage at high speed.

The embodiment illustrated in Fig. 2 is in some respects similar to the above-described system of Fig. 1. Therefore, elements of similar design and function are denoted by identical reference numerals in both figures.

According to Fig. 2, the material 1, taken from a machine unit 2 and passing onto a reel 3, is kept at constant tension by a drive system which includes a motor WM with an armature 4 and two field windings 5 and 6. The armature circuit receives variable voltage from the armature 7 of a main generator MG. The field winding 8 of the main generator and the speed-limiting field winding 6 of motor WM are energized by substantially constant voltage from the mains X and Y of an exciter EX whose armature 9 is driven by a constant speed motor 10. A rheostat 11 in the circuit of generator field winding 8 serves to adjust the generator output voltage and a calibrating resistor 12 is series-connected in a circuit of motor field winding 5.

The armature 13 of a regulating generator RG is also driven by a motor 10 and under control by three field windings 15, 26 and 27. Winding 15 provides tuned self excitation in the manner explained above with reference to the field winding 15 of generator RG in Fig. 1. The armature circuit of generator RG (Fig. 2) is connected to a motor field winding 5 through a rectifier 19 and a calibrating resistor 20.

Field winding 27 provides all of the pattern field excitation for the regulating generator and is connected across mains X and Y through a rheostat 29. The circuit of winding 27 includes also a resistor 30 which is connected across the secondary of a saturable reactive impedance device 31 which has a winding connected across the main generator armature 7. The winding 26 of generator RG provides a pilot field in opposition to the pattern field of winding 27. Winding 26 is designed as a voltage-excited winding and lies across a resistor 32 which is series-connected in the armature circuit of motor WM and hence traversed by the motor load current. The voltage drop across resistor 32 and hence the excitation of pilot field winding 26 is proportional to the motor load current.

The reactive impedance device 31 which, for impedance-matching purposes, is shown as a transformer, although it will be understood that a reactor of the auto-transformer type may also be employed, is so rated in magnetic respects that its core remains unsaturated, i. e., is magnetized within the ascending and substantially linear portion of its saturation characteristic, during the entire operating range. During steady state conditions, the direct current flowing through the primary coil of reactor 31 induces no secondary current so that, consequently, the excitation of the pattern field winding 27 is now constant and determined by the selected setting of the rheostat 29. During periods of voltage change however, a current is induced in the secondary of the reactor 31 so that a corresponding voltage drop is impressed across the resistor 30. Under accelerated conditions, this voltage drop acts additive so that the pattern field excitation of winding 27 is increased and causes the regulating generator to reduce the excitation of the motor field winding 5, in order to make the motor run faster. During decelerating conditions, the inductive discharge voltage of the saturable reactor acts subtractive in the pattern field circuit so that the excitation of the pattern field winding 27 is decreased and the excitation of motor field winding 5 increased, in order to cause the reel motor to decelerate at a higher rate. Due to the fact that the inductive discharge current persists during a length of time determined by the resistance in the reactor circuit, this circuit has a delaying effect so that the resultant control imposed on the regulating generator RG is equivalent to the mechanical inertia effect obtained in the embodiment of Fig. 1 by the flywheel motor. If desired, a short circuited reactor winding, as shown at 33, may be provided to obtain the required timing period.

While I have shown two control systems in which the main generator is operated at variable speeds, the invention can also be applied in systems whose main generator operates at constant speed so that the field rheostat of the generator is to be adjusted in order to change the generated output voltage. In cases of the latter type, the armature of the main generator may be mounted on the shaft of the drive motor which actuates the regulating generator, with or without an additional exciter. These examples may suffice to illustrate that systems according to my invention are capable of various modifications and variations different from those described in the foregoing, without departing from the principles of the invention and within its essential features set forth in the claims attached hereto.

I claim as my invention:

1. A variable voltage drive, comprising a main generator for providing variable load voltage, a drive motor having an armature circuit connected to said main generator to be energized by said load voltage, a regulating generator having an output circuit for providing a variable control voltage, means for varying the speed-torque performance of said motor in dependence upon said control voltage, said regulating generator having field means for controlling said control voltage, circuit means connecting said field means with said armature circuit for providing a first component excitation for said regulating generator in dependence upon the current in said armature circuit, circuit means connected to said field means for providing a second component excitation of normally constant magnitude for said regulating generator in opposition to said first component excitation, and circuit means connected between said armature circuit and said field means and including inertia means for providing for said regulating generator a third component excitation which varies in dependence upon changes of said load voltage at a retarded rate of change due to said inertia means, whereby the resultant field excitation produced by said field means in said regulating generator varies in dependence upon the differential value of said second component excitation relative to the cumulative magnitudes of said first and third excitations and, upon changes in said load voltage, is temporarily changed at a disproportionate rate due to said inertia means in order to increase the speed of response of said motor to such changes.

2. An electric drive, comprising means for providing a direct-current load voltage of variable magnitude, a drive motor having an armature circuit connected to said means to be energized by said load voltage, a regulating generator having an output circuit for providing a variable control voltage, means for varying the speed-torque performance of said motor in dependence upon said control voltage, said regulating generator having field means for controlling said control voltage and three field control circuits connected to said field means for providing excitation therefor, one of said control circuits being connected with said armature circuit for providing a first component excitation in dependence upon the current in said armature circuit, another one of said control circuits having means for providing a normally constant component excitation in opposition to said first component excitation, and the third control circuit being connected to said armature circuit and having inertia means for providing a third component excitation which varies in dependence upon changes of said load voltage at a retarded rate of change due to said inertia means, whereby the resultant field excitation produced by said field means in said regulating generator varies in dependence upon the differential value of said second component excitation relative to the cumulative magnitudes of said first and third excitations and, upon changes in said load voltage, is temporarily changed at a disproportionate rate due to said inertia means in order to increase the speed of response of said motor to such changes.

3. An electric drive, comprising means for providing a direct-current load voltage of variable magnitude, a drive motor having an armature circuit connected to said means to be energized by said load voltage and having a field winding for varying the motor speed, a regulating device having an output circuit connected to said field winding for supplying an exciting voltage therefor and having three control circuits for jointly controlling said exciting voltage, one of said control circuits being connected with said armature circuit to be energized in dependence upon the current in said armature circuit, means connected with another one of said control circuits for providing normally constant energization therefor and the third control circuit being connected to said armature circuit and having inertia means so as to receive energization which varies in dependence upon changes of said load voltage at a retarded rate of change due to said inertia means, whereby the resultant field excitation of said motor field winding has a variable magnitude determined by the resultant effect of said three control circuits and, upon changes in said load voltage, is temporarily disproportionately varied due to said inertia means so as to increase the speed of response of said motor to load voltage changes.

4. An electric drive, comprising means for providing a direct-current load voltage of variable magnitude, a drive motor having an armature circuit connected to said means to be energized by said load voltage and having a field winding for varying the motor speed, an inertia motor connected in parallel to said drive motor to be energized by said load voltage, a regulating device having an output circuit connected to said field winding for supplying an exciting voltage therefor and having three control circuits for jointly controlling said exciting voltage, one of said control circuits being connected with said armature circuit to be energized in dependence upon the current in said armature circuit, means connected with another one of said control circuits for providing normally constant energization therefor, said third control circuit being associated with said inertia motor to be energized in dependence upon the current of said inertia motor, whereby the resultant field excitation of said drive motor, upon changes of said load voltage, is temporarily disproportionately varied due to said inertia motor so as to increase the speed of response of said drive motor to such changes.

5. A variable voltage drive, comprising a main generator for providing variable load voltage, a drive motor having an armature circuit connected to said main generator to be energized by said load voltage and having a field winding for varying the motor speed, an inertia motor connected in parallel to said drive motor to be energized by said load voltage, a regulating generator having an output circuit connected to said field winding to provide variable excitation therefor and having three field windings for jointly controlling said excitation, one of said field windings being connected to said armature circuit to be energized in dependence upon the current of said drive motor, another one of said field windings being connected to said inertia motor to be energized in dependence upon the current of said inertia motor, and means connected to said third field winding to provide it with normally constant energization, whereby the resultant field excitation of said drive motor, upon changes of said load voltage, is temporarily disproportionately varied due to said inertia motor so as to increase the speed of response of said drive motor to such changes.

6. An electric winder drive, comprising a winder drive motor having an armature circuit and two cumulative field windings, a main generator for energizing said armature circuit by variable load voltage, a regulating generator having an output circuit connected to one of said field windings to provide variable excitation therefor and having three field exciting means for jointly controlling said excitation, an exciting circuit of substantially constant voltage, a first one of said means and said other field winding being connected to said circuit to receive normally constant energization respectively, a second one of said means being connected with said armature circuit so as to be energized in opposition to said first means and in dependence upon the current of said drive motor in order to cause said regulating generator to regulate said motor for normally constant current, and a control circuit including an inertia delayed impedance device and being connected between said third means and said armature circuit for energizing said third means in dependence upon said load voltage so as to change the resultant excitation of said one field winding temporarily at a disproportionate rate due to said device when said load voltage changes in order to cause said motor to maintain, during periods of speed change, a substantially constant tension in the material to be wound by correspondingly modifying the said armature current.

7. An electric winder drive, comprising a winder drive motor having an armature circuit and a field circuit, a main generator for energizing said armature circuit by variable load voltage, a regulating generator having an armature connected to said field circuit to provide variable excitation therefor and having three field windings for jointly controlling said excitation, means for energizing one of said windings by a normally constant voltage, a second one of said windings being connected with said armature circuit to be energized in accordance with the current in said armature circuit, and inertia-delayed circuit means connecting the third winding with said armature circuit for energizing the third winding in dependence upon said load voltage, said second and said third winding being connected to act cumulatively with respect to each other and being jointly differential and balanceable relative to said first winding, whereby said motor is regulated by said regulating generator to maintain substantially constant winding tension during steady state operation as well as, due to said inertia-delayed circuit means, during periods of speed change.

8. An electric winder drive, comprising a winder drive motor having an armature circuit and a field circuit, a main generator for energizing said armature circuit by variable load voltage, a regulating generator having an armature connected to said field circuit to provide variable excitation therefor and having three field windings for jointly controlling said excitation, means for energizing one of said windings by a normally constant voltage, a second one of said windings being connected with said armature circuit to be energized in accordance with the current in said armature circuit, an inertia motor connected to said main generator in parallel to said drive motor and connected to the third winding for energizing said third winding in dependence upon the current of said inertia motor, said second and said third winding being connected to act cumulatively with respect to each other and being jointly differential and balanceable relative to said first winding, whereby said motor is regulated by said regulating generator to maintain substantially constant winding tension during steady state operation as well as, due to said inertia-delayed circuit means, during periods of speed change.

9. A drive for passing sheet material from a machine unit onto a winding reel, comprising a main generator having means for driving it at a variable speed proportional to that of the machine unit for generating a variable load voltage dependent upon said speed, a drive motor for the reel having an armature circuit connected to said main generator to be energized by said load voltage and having field means for controlling the motor speed, a regulating generator and means for driving it at substantially constant speed, said regulating generator having an armature connected to said motor field means for providing variable excitation therefor and having three field control circuits for jointly controlling said excitation, a first one of said control circuits being associated with said armature circuit to be energized in dependence upon the load current of said drive motor, a second one of said control circuits including a reactive impedance device and being connected to said armature circuit to be energized in dependence upon said variable load voltage, and means for energizing the third control circuit by substantially constant voltage and in opposition to said first and second control circuits so that the control effects of said three circuits are substantially balanced under steady state operation of the drive, whereby said drive motor is regulated by said regulating generator for maintaining substantially constant winding tension during steady state operation as well as, due to said reactive impedance device, during periods of speed change of said main generator.

10. A drive for passing sheet material from a machine unit onto a winding reel, comprising a main generator having means for driving it at a variable speed proportional to that of the machine unit for generating a variable load voltage dependent upon said speed, a drive motor for the reel having an armature circuit connected to said main generator to be energized by said load voltage and having field means for controlling the motor speed, a regulating generator and means for driving it at substantially constant speed, said regulating generator having an armature connected to said motor field means for providing variable excitation therefor and having three field windings for jointly controlling said excitation, a first one of said windings being connected with said armature circuit to be energized in dependence upon the load current of said drive motor, a reactive impedance device connected across said armature circuit and attached to a second one of said windings for energizing the latter in dependence upon said variable load voltage so as to provide a temporarily disproportionately increased energization due to said device, and means for energizing the third winding by substantially constant voltage and in opposition to said first and second control circuits so that the control effects of said three circuits are substantially balanced under steady state operation of the drive, whereby said drive motor is regulated by said regulating generator for maintaining substantially constant winding tension during steady state operation as well as, due to said inertia-delayed device, during periods of speed change of said main generator.

11. A variable voltage drive, comprising a main generator for providing variable load voltage, a drive motor having an armature circuit connected to said main generator to be energized by said load voltage, a regulating generator having an output circuit for providing a variable control voltage, means for varying the speed-torque performance of said motor in dependence upon said control voltage, said regulating generator having pattern field means for providing a component pattern field of a normally constant magnitude, and pilot field means for providing a variable pilot field in opposition and balanceable relative to said pattern field, said pilot field means being connected to said armature circuit to be energized in accordance with the armature current of said drive motor in order to cause said regulating generator to regulate said motor for a normally constant armature current, and a control circuit comprising inertia-delayed reactance means and being disposed between said regulating generator and said armature circuit for temporarily varying the magnitude of said pattern field upon occurrence of changes in said load voltage in order to then cause said regulating generator to vary the armature current of said motor in the direction required to increase the speed of response of said motor to such changes.

ELROY I. EIGENBERGER.

REFERENCES CITED

The following references are of record in the file of this patent:

UNITED STATES PATENTS

| Number | Name | Date |
|---|---|---|
| 2,406,424 | King | Aug. 27, 1946 |
| 2,408,217 | King | Sept. 24, 1946 |